United States Patent [19]

Brommelsiek et al.

[11] Patent Number: 5,766,668

[45] Date of Patent: Jun. 16, 1998

[54] METHOD FOR SYNTHESIZING CHLORIDE BASED FEED PRECURSOR AND PRODUCT RESULTING THEREFROM

[75] Inventors: Wayne Brommelsiek, Chisago City; Dean Lacy, Forest Lake, both of Minn.; Keith Dingwall, Elizabethtown, Canada; Martin Fleury, Morrisburg, Canada; Donald Mabo, Iroquois, Canada

[73] Assignee: Chinook Group, Inc., North Branch, Minn.

[21] Appl. No.: 411,471

[22] Filed: Mar. 27, 1995

[51] Int. Cl.$^6$ .................................................. A23K 1/175

[52] U.S. Cl. ........................... 426/648; 426/74; 426/471; 426/807

[58] Field of Search .................... 426/74, 601, 471, 426/648, 807; 424/442, 489, 439; 514/642

[56] References Cited

U.S. PATENT DOCUMENTS

| | | | |
|---|---|---|---|
| 3,949,070 | 4/1976 | Arai et al. | 428/118 |
| 4,065,557 | 12/1977 | Frommer et al. | 424/181 |
| 4,394,377 | 7/1983 | Spires | 424/177 |
| 4,425,202 | 1/1984 | Sullivan | 204/72 |
| 4,519,961 | 5/1985 | Schumacher et al. | 424/35 |
| 4,719,228 | 1/1988 | Rawlins | 514/456 |
| 4,775,540 | 10/1988 | Hertel et al. | 426/74 |
| 4,820,532 | 4/1989 | Bayer et al. | 426/74 |
| 4,859,709 | 8/1989 | Rawlins | 514/770 |
| 4,948,589 | 8/1990 | Iijima et al. | 424/438 |
| 4,962,094 | 10/1990 | Jamas et al. | 514/54 |
| 5,185,382 | 2/1993 | Neumann et al. | 521/84 |
| 5,208,267 | 5/1993 | Neumann et al. | 521/79 |
| 5,209,858 | 5/1993 | Heinsohn et al. | 252/1 |
| 5,248,702 | 9/1993 | Neumann et al. | 521/84.1 |
| 5,486,363 | 1/1996 | Kiefer et al. | 424/442 |

FOREIGN PATENT DOCUMENTS

| | | |
|---|---|---|
| 985893 | 3/1976 | Canada . |
| 93 10 8769 | 2/1995 | European Pat. Off. . |
| 1307421 | 11/1961 | France . |
| 2151076 | 4/1973 | France . |
| 2174170 | 10/1973 | France . |
| 1193536 | 1/1977 | Germany . |
| 2554032 | 6/1977 | Germany . |
| 1172920 | 8/1985 | U.S.S.R. . |
| 1161970 | 8/1969 | United Kingdom . |
| 1168444 | 10/1969 | United Kingdom . |
| 1412204 | 10/1975 | United Kingdom . |

OTHER PUBLICATIONS

Technical Library, GP-73, Degussa, Degussa Corporation, Converting Liquids to Dry Flowable Powders using Sipernat® and Sipernat® 50.

Technical Library, GP-11, Degussa, Degussa Corporation, Conditioning of Animal Feed Products with Silicas.

Technical Library, GP-12, Degussa, Degussa Corporation, Degussa Sipernat® for Spray-Drying Applications.

Technical Library, GP-7, Degussa, Degussa Corporation, Degussa Silicas as Free Flow & Conditioning Agents for the Food Industry, 1990.

Technical Bulletin Pigments, No. 31, Degussa, Synthetic Silicas as a Flow Aid and Carrier Substance, Jul. 1993.

Precipitated Silicas, Manufacturing/Properties/Applications, Degussa, Degussa Corporation, 1992.

Technical Bulletin Pigments, Synthetic Silica—A Modern Processing Aid in the Animal Feed Industry, No. 30, Degussa, 1979.

Abstract page for Japanese Patent Application 071160, filed Apr. 5, 1985.

Abstract page for Japanese Patent Application 072324, filed Apr. 5, 1985.

Abstract page for Japanese Patent Application 111173, filed May 7, 1987.

Abstract page for Japanese Patent Application 106291, filed May 1, 1987.

*Primary Examiner*—José G. Dees
*Assistant Examiner*—Barbara Badio
*Attorney, Agent, or Firm*—Merchant, Gould, Smith, Edell, Welter & Schmidt, P.A.

[57] ABSTRACT

The invention is a choline feed stock precursor having greater than about 80-wt % of choline chloride, a lubricating agent, and an excipient. Generally, the composition of the invention may comprise a choline compound at concentrations above 80 wt-%, trace amounts of lubricating agent, and an excipient. To extend shelf-life, a hydrophobic stabilizing agent or adjuvant may be added to the composition of the invention. This preferred composition remains free-flowing when subjected to ambient conditions of up to 49° C. and less than 90% relative humidity. The invention is also a process for formulating choline feed stock precursors, having greater than about 80-wt % choline chloride. The method of the invention generally includes the steps of inter-mixing choline and an excipient, spray drying this mixture in the presence of a lubricating agent and adding an additional portion of hydrophobic stabilizing agent, to the mixture.

22 Claims, 2 Drawing Sheets

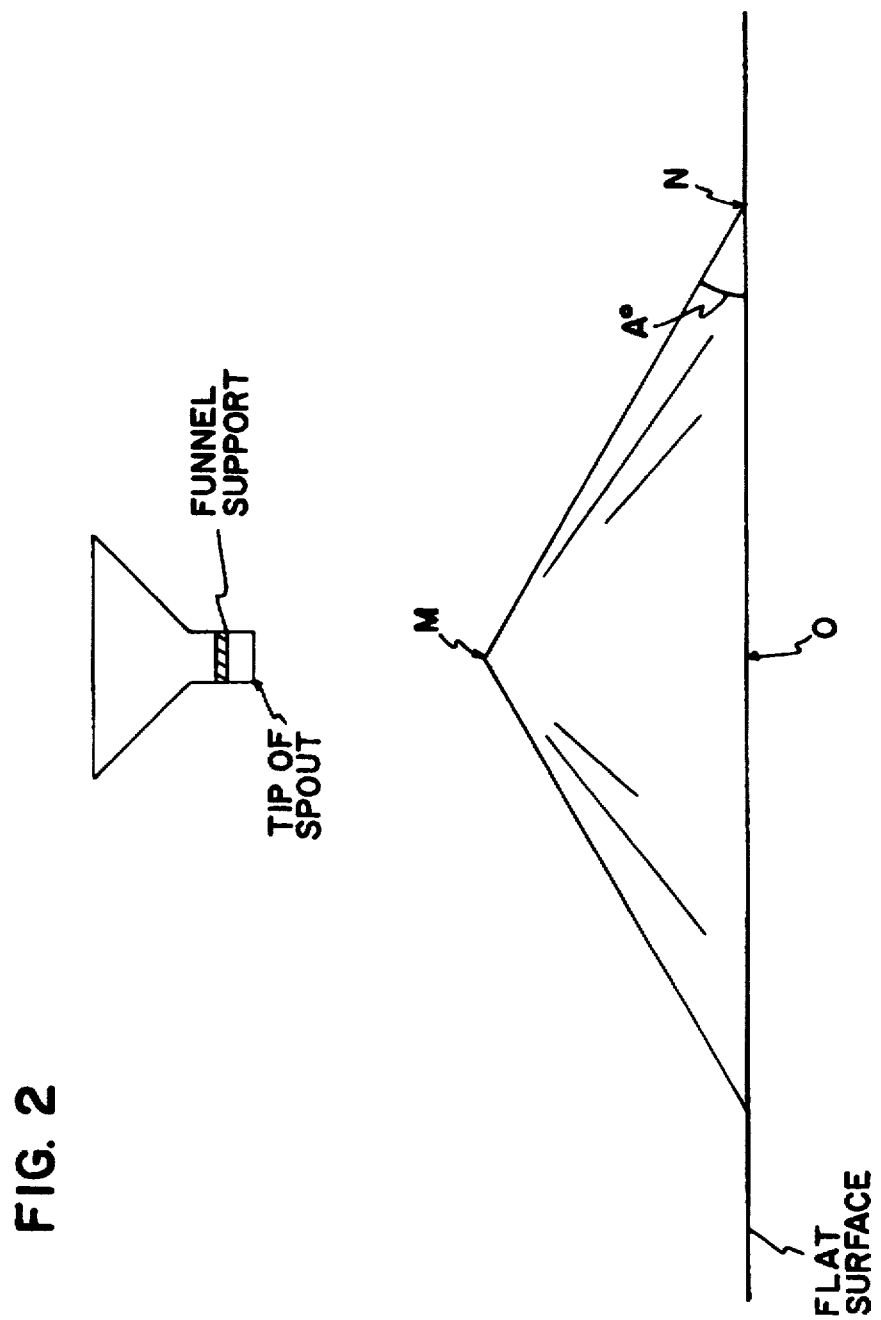

1

METHOD FOR SYNTHESIZING CHLORIDE BASED FEED PRECURSOR AND PRODUCT RESULTING THEREFROM

FIELD OF THE INVENTION

This invention is generally related to methods for the production of choline-feed precursors and compositions resulting therefrom. More specifically, this invention is related to processes useful in the production of highly concentrated stabilized, solid choline feed stocks. Further, the invention relates to granular compositions for various feed stocks such as poultry in which choline or a physiologically acceptable derivative thereof may be used with an animal feed to produce a beneficial nutritional effect.

BACKGROUND OF THE INVENTION

Choline and its physiologically acceptable derivatives such as choline chloride are essential nutrients required for the normal growth and development of all animal species. Most production animal species require the supplementation of choline to commercial diets. Choline chloride is generally the primary source of choline activity for supplemental applications.

Choline itself is a member of the group consisting of vitamins of the B complex and it is widely used for enriching animal feeds. Choline is indispensable in the metabolism of fats. In many animal species choline deficiencies initially leads to fatty degeneration of the liver and renal damage and subsequently to cirrhoses of the liver. In poultry, for example, deformities of the joints and bones, retarded growth and increased mortality may be observed.

Because choline cannot be handled or processed in its free form, generally derivatives including salts and organic-inorganic choline reaction products which are physiologically acceptable are prepared and used. One of the most common forms of choline is the salt choline chloride. Choline chloride is highly hygroscopic and upon exposure to environmental or ambient humidity will absorb moisture from the environment and deliquesce. Choline chloride will immediately attract water vapor when in contact with the atmosphere and become liquid. As a result, choline chloride, as a pure substance is generally thought not to be available as a solid. Present technology provides for liquid choline chloride and the application of choline chloride onto certain excipients.

For example, Neuman et al., U.S. Pat. Nos. 5,248,702 and 5,208,267, and 5,185,382 note the use of spray dried silica as a excipient for choline chloride solutions. Rawlins, U.S. Pat. No. 4,719,228 and 4,859,709, also note the use of silicas to absorb liquid animal feed additives such as, molasses and choline chloride.

In related arts, both Sullivan, U.S. Pat. No. 4,425,202 and Heinsohn et al., U.S. Pat. No. 5,209,858 disclosed the methods for the stabilization of choline and choline derivatives against various physical and chemical changes which occur in the environment of use.

Generally, choline chloride or its physiologically acceptable derivatives have been produced in solid form by at least two different processes. The first process is generally regarded as the loading of liquid choline chloride onto a silica powder. These compositions are characterized by the use of a silica powder excipient to absorb liquid choline chloride. Once containing the choline chloride, the powder remains free flowing even with as much as 20-25% water concentrations in the mixture. The choline chloride may be present in concentrations ranging around 50-60% based upon an, as is, weight basis.

An example of such a mixture can be seen in Bayer et al., U.S. Pat. No. 4,820,532 which shows high concentrations of choline chloride deposited upon the silica powder. Similarly, Hertel et al. U.S. Pat. No. 4,775,540 also disclosed the application of choline chloride in concentrations as high as 50% onto a silica powder matrix. Hertel incorporates a stearate salt into the choline liquid prior to drying. Without additional drying agents, Hertel cannot provide a choline chloride concentration in excess of 80 wt-% of the composition.

A second process for creating a physically stable choline product is to absorb a liquid choline product onto an organic grain-type excipient and then dehydrate the mix. This results in a choline chloride concentration of up to 60 wt-% active concentration in the mix. An example of such a composition is seen in U.S. Pat. No. 4,948,589 to Iijima et al. which discloses the use of choline products which have been immobilized on various structures including corn cob meal, and the like in a further process which granulates the choline product and then overcoats that product with various constituents. Further, Spires, U.S. Pat. No. 4,394,377 discloses the use of choline product in ruminant applications as a supplemental dietary mix.

All of these products are generally produced by mixing a concentrated liquid source of a choline salt or derivative with an absorbent material, suitable for animal feeding, and then removing the excess moisture through a drying process. The absorption characteristics of the excipient and the hygroscopic nature of the choline limit the amount of choline able to be absorbed on the excipient.

When exposed to normal atmospheric conditions, these products will absorb significant quantities of water and become unfit for use. The additional water may dilute the choline concentration and preclude the formulation of a product having the desired dietary efficacy. The wet product may cause physical handling problems for the feed manufacturer by hastening build-up in the mixing and transportation system. Further, any free water which may exist can cause reactions to take place which will destroy other vitamins present in the feed.

As a result, there is a need for a process which will provide a physically stable choline composition having a high concentration without concern for the usual environmental effects resulting in choline feed stocks physically unacceptable for use in mixing animal feeds.

SUMMARY OF THE INVENTION

In accordance with a first aspect of the invention, there is provided a choline feed stock precursor having, greater than about 80-wt % of choline, a lubricating agent and an excipient. In a more preferred mode, this composition additionally comprises a hydrophobic stabilizing agent and may absorb up to about 50% moisture based on the weight of the composition and remain free-flowing. The product will generally remain free-flowing in ambient conditions of up to 49° C. and less than 90% relative humidity.

In accordance with another aspect of the invention, there is provided a process for formulating a choline feed precursors having greater than about 80-wt % choline chloride. The process generally includes the steps of inter mixing the choline and an excipient spray drying the mixture in the presence of a lubricating agent and adding a hydrophobic stabilizing agent to the spray dried mixture.

Spray drying of the liquid choline chloride provides a composition having higher concentrations of choline to the feed producer. Previous experience with spray drying has shown the difficulty in producing a high concentration choline chloride feed precursor product from a 75% aqueous solution. Solid compositions produced from this type of a liquid often deliquesce within a short period of time and becomes unfit for use. In addition, the rapid moisture pickup causing handling problems in the drying system reduces the efficiency of production and raises costs.

The process of the invention was developed to produce a free-flowing, more highly concentrated choline product. The process consists of the addition of an inert physiologically acceptable product such as hydrophilic precipitated silica of the amorphous precipitated silica family to the to the liquid choline chloride prior to pumping the liquid into the spray dryer. The fine powder is then thoroughly mixed with the liquid using low shear mixing. At the entrance of the spray dryer, an amount of system lubricant is added to the mix. The final addition of dry granular hydrophobic adjuvant to the mix results in a fine, free-flowing white powder having a concentration of choline salt or derivative ranging from 80–99%. The product remains free-flowing under conditions of high humidity and temperature. Generally the composition of the invention will remain thermodynamically stable at choline chloride concentrations over 80 wt-%. The product will remain free flowing at temperatures up to about 49° C. and relative humidities up to about 90%.

BRIEF DESCRIPTION OF THE DRAWING

FIG. 2 is a schematic depiction of experimental testing undertaken in accordance with working Example 8.

DETAILED DESCRIPTION OF THE PREFERRED EMBODIMENTS

Figure 1:
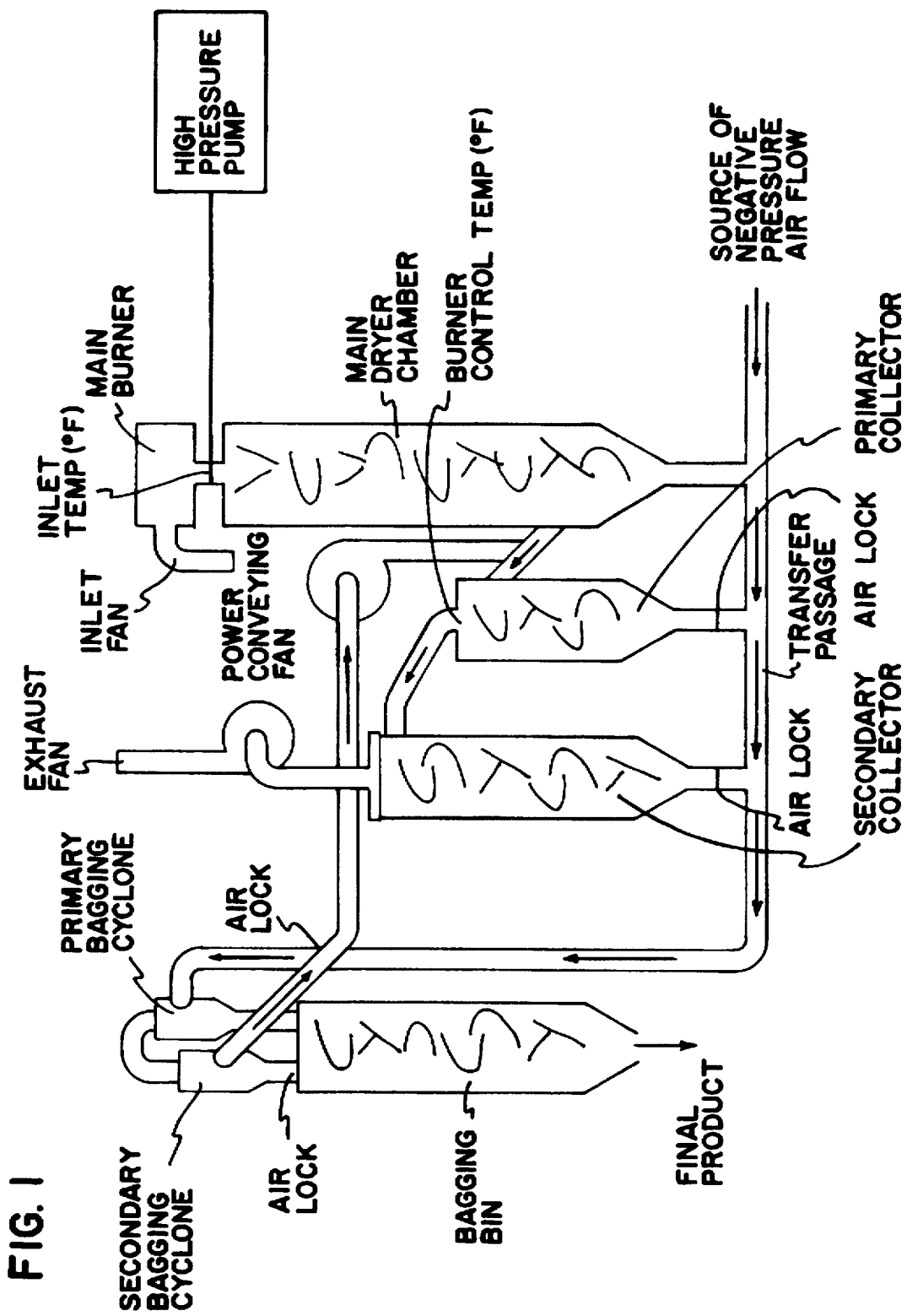
FIG. 1 is a schematic depiction of a spray drying apparatus useful in accordance with the various embodiment of the invention.

The invention concerns the production of highly concentrated physically stable choline products. These choline products, in the form of choline salts and derivatives, are generally carried on an inert substrate, and spray dried in the presence of a lubricating agent.

A. The Composition

Choline is (β-hydroxyethyl)trimethylammonium hydroxide which is a cationic substituent of a salt or other choline based compound, complex, derivative, or system. In feed applications choline is a basic element in promoting growth and health through addition to feed stocks, vitamins, and dietary supplements.

Choline is a precursor of acetyl choline which is important in nerve-muscle stimulation. Choline is also an important contributor of methyl groups needed for synthesis of metabolites. Choline has also been found to regenerate methionine lost in transmethylation reactions. Thus, choline makes this essential amino acid available for use in protein syntheses.

Choline is a colorless, viscous, hygroscopic, strongly alkaline liquid. It is very soluble in water and ethanol. Choline can be prepared synthetically from triethylamine and ethylene chlorohydrin and ethylene oxide according to methods known to those of skill in the art.

Choline forms salts and complexes with inorganic and organic acids to give crystalline material. Choline and choline compounds of all types may have utility in the practice of this invention. Choline compounds include the full scope of acid-salts, fatty acid complexes, lecithin-based and similar phosphatide compounds, and various inner salt compounds comprising, for example, choline and phosphoric acid which are not choline esters of phosphoric acid. Choline is usually used as one of the various acid salts because the crystalline materials are substantially easier to handle than is the viscous, hygroscopic base itself.

Choline complexes and salts are, for example, choline ascorbate, choline bicarbonate, choline chloride, choline citrate, choline bitartrate, choline dihydrogen citrate, and choline gluconate, as well as choline fatty acid complexes including choline fatty acids and choline salt-fatty acid mixtures to name some of the compositions most readily available commercially.

Additionally, there are a number of other choline containing compounds which may be used in the practice of this invention. One group of such compounds are the choline containing phospholipids, best exemplified by the phosphatide lecithin or phosphatidylcholine. These compounds comprise choline esters of phosphoric acid linked to mixtures of fatty acids by polyols. Lecithin, for example, is a mixture of the diglycerides of stearic, palmitic and oleic acids linked to the choline ester of phosphoric acid. A number of other compounds containing choline and phosphoric acid, but where choline is not the ester of phosphoric acid, are known in the art. For example, choline hydroxide, dihydrogen phosphate, inner salt ester with 1-monostearin, DL-, (CAS No. 17364-19-1). While it is possible to use these and similar materials, it is commercially more desirable and more convenient to employ choline salts.

In a preferred form, the claimed invention is practiced using choline chloride in an aqueous solution. Choline chloride itself may be formulated by means known to those of skill in the art and is commonly available from the Chinook Group, under the trade name of Choline Chloride 70% or Choline Chloride 75%. In use, the preferred concentration of active choline chloride within the solution should range from about 70% to 80% and most preferably from about 75% to 78 wt-%.

The composition of the invention also comprises a lubricant. The lubricant may be any number of constituents which are useful in producing a stable choline product. To this end, this constituent assists in providing lubricity to the system during spray-drying and preventing deliquescence of the final composition. Any variety of compositions may be used which provide these functions. Generally, fatty acids and acid-esters, surfactants including nonionic, anionic, cationic compounds, as well as amine and diamine compounds, esters, and carboxylic acid salts are all representative of compounds which may be used to provide lubricity and stabilize the choline product. Other compounds which may be used in accordance with the invention as lubricants or spraydry aids include magnesium oxide, magnesium carbonate, calcium carbonate, iron oxide, iron carbonate, cobalt oxides, copper oxides, manganese carbonate, zinc carbonate, and zinc oxides, calcium hypophosphate, calcium phosphate, calcium carbonate, talc, among others.

Preferably, the lubricant used in the invention is a carboxylic acid or acid salt. A wide variety of carboxylic acids and acid-salts may be usefully employed in the compositions of the invention. Those acids found to provide effective lubricity are those having the general formula RCOOH wherein R represents an aliphatic group having from about 5 to about 23 carbon atoms (fatty acids having about 6 to 24 carbon atoms). For use in formulating the solid form of the composition the $C_{8-24}$ fatty acids are preferred as they assist in solidification of the composition. The aliphatic group may be branched or unbranched and saturated or unsaturated but is preferably a straight chain alkyl group. Preferred carboxylic acids and acid-salts include the $C_{10-18}$ fatty acids and mixtures thereof.

Specific examples of suitable carboxylic acids include such saturated fatty acids as heptanoic ($C_7$), octanoic ($C_8$), nonanoic ($C_9$), decanoic ($C_{10}$), undecanoic ($C_{11}$), lauric ($C_{12}$), tridecanoic ($C_{13}$), tetradecanoic ($C_{14}$), palmitic $C_{16}$, stearic ($C_{18}$), arachidic (eicosanoic) ($C_{20}$), docosanoic ($C_{22}$), and tetracosanoic ($C_{24}$); monounsaturated fatty acids such as lauroleic ($C_{12}$), myristoleic ($C_{14}$), palmitoleic ($C_{16}$), oleic ($C_{18}$), and linolenic (tri-unsaturated $C_{18}$); and substituted fatty acids such a ricinoleic (hydroxy-substituted $C_{18}$), etc.

When used as an acid-salt, these fatty acids may be combined with the appropriate alkali or alkaline-earth metal cation such as calcium, sodium, potassium, magnesium and mixtures thereof. In practice we have found that stearates such as calcium stearate provide the most optimal lubricating efficacy while also preserving the physical stability of the choline product. The lubricant used in the practice of the invention is generally added at the time that the composition is spray-dried, and before the final stabilization of the composition. The lubricant may or may not be found in the final choline feed stock precursor or choline containing feed.

The composition of the invention also comprises an excipient. The excipient functions to facilitate the spray drying of the choline and, in turn, the production of a free-flowing stable product. The excipient affects the consistency and form of the composition of the invention. Any number of compounds and polymers may be used as an excipient which facilitates the production of a free-flowing choline chloride powder. Those compounds which are preferred to be used as excipients include organic and inorganic constituents which function effectively to prevent the deliquescing of the choline after spray drying. In the context of this invention, "free-flowing" means that the choline chloride composition of the invention will have an angle of repose of less than about 35° from horizontal and preferably less than about 30° from horizontal.

Exemplary compounds useful as excipients in this invention include inert inorganic compounds, such as alkali, alkali earth, and transition metal oxides, hydroxides, and halogens which provide a hygroscopicity allowing the absorption of high concentration of choline into the composition while maintaining the desired flowability and particle size.

Compounds which may also be useful as excipients in accord with the invention are oxides such as silicon oxides, zinc oxides, aluminum oxides, calcium oxides, carbon oxides, lithium oxides, sodium oxides, and potassium oxides among others. Generally, the concentration of excipient will range from about 0 wt-% to 10 wt-%, preferably from about 0.25 wt-% to 5 wt-%, and most preferably about 3 wt-% to 5 wt-% of the final choline chloride composition.

Preferably, the excipient used in the composition of the invention will comprise a hydrophilic silica or silicon dioxide, ($SiO_2$). Silica has been found useful as a biologically acceptable excipient in any number of feed applications. Furthermore, hydrophilic silicon dioxide has been found to readily absorb aqueous choline chloride solutions used in the composition of the invention.

Most preferably when silica is used as the excipient in the composition of invention the concentration will range from about 3 wt-% to 5 wt-%, and preferably from about 4 wt-% to 5 wt-%. Diminishing the concentration of the excipient generally results in varied particle size within the same batch. Increasing excipient concentrating results in generally uniform particle size within the same batch.

The particle size of the silica may range from about 25 µm to 200 µm and preferably from about 50 µm to 150 µm and not preferably about 75 µm to 125 µm. Preferred silica products include Sipernat® products, such as Sipernat® 22 and 50 available from Degussa. We have found that particle sizes of about 100 µm as Sipernat® 22 worked very well in the composition of the invention.

Also useful as excipients in accordance with the invention are any number of inorganic-organic salts, and organic constituents which are cellulosic in nature. Examples of organic excipients which may be useful include hay, straw, cornstalks, cottonseed hulls, oats, barley, and cereal brans, corn cob flour, beet pulp, sugar cane bagasse, rice hulls, wood flour, peanut hulls among other absorbent organic material.

When an organic constituent is used as the excipient of the invention, generally corn cob flour is preferred in concentrations ranging from about 0.5 wt-% to 15 wt-%, preferably from about 5 wt-% to 10 wt-%, and most preferably from about 6 wt-% to 8 wt-% which is commercially available from the Andersons, Maumee, Ohio.

The composition of the invention also preferably comprises a hydrophobic adjuvant. The hydrophobic adjuvant functions to prevent agglomeration of the composition of the invention. Without the hydrophobic adjuvant, the processes and composition of the invention provide for the synthesis of high concentration choline chloride compositions, 80 wt-% or greater choline. The use of the hydrophobic adjuvant allows for the production a stable choline chloride composition which remains free-flowing when subjected to ambient conditions of up to 49° C. and less than 90% relative humidity.

The hydrophobic adjuvant may comprise any inorganic compound, organic compound, or mixture thereof. In certain instances, an excess of organic-stearate lubricant may be used to preclude agglomeration. Preferably, the hydrophobic adjuvant comprises a hydrophobic silica such as that available from DeGussa as brands D-10 and preferably D-17. The hydrophobic adjuvants which have been found useful in accordance with the invention generally have a particle size of less than about 25 µm, preferably about less than 20 µm, and most preferably about 10 µm or less.

The concentration of hydrophobic adjuvant generally ranges from about 0 wt-% to 5 wt-%, preferably from about 1 wt-% to 3 wt-% and most preferably is about 1 wt-%.

TABLE 1

| FINISHED PRODUCT CONCENTRATIONS (wt-%) | | | |
|---|---|---|---|
| Ingredient | General | Preferred | Most Preferred |
| Choline chloride | 80–99 | 85–99 | 90–99 |
| Excipient | 0–10 | 0.25–5 | 3–5 |
| Moisture | <5 | <4 | <3 |
| Hydrophobic Adjuvant | 0–5 | 1–3 | 1 |

B. Formulation

The composition of the invention is generally formulated through a multi-step process including the mixing of choline chloride with several other chemical constituents, spraydrying, and stabilizing of the final product. Generally, an active choline chloride solution (+70 wt-%) is mixed with a first portion of a excipient such as a silica compound and retained as a liquid. This mixture may then be heated to a temperature ranging from about 20° C. to 85° C., and preferably from about 60° C. to 80° C. This temperature is held for a time period of about 5 minutes to 20 minutes. Liquid choline chloride of from 70–85% (wt-%) concentration is mixed with from about 2 wt-% to 10 wt-% by weight of an excipient such as hydrophilic precipitated silica and preferably amorphous precipitated silica,($SiO_2$).

The liquid choline and silica excipient are allowed to mix for a period of about 0.1 hour to 1 hour and preferably about 0.5 hour using a low speed paddle type mixer. Following mixing, the composition is pumped to the spray drying equipment. The composition may then be introduced into an atomizer such as those sold by DeLaval, Inc. under the model number 84-24 or a Heyl-Patterson atomizer.

At this time, a lubricant, such as a stearate salt, may be added into the system and introduced into the composition at the top of the spray dryer. The lubricant acts as a flow agent for the entire system to prevent clogging due to the sticky nature of the hot aqueous choline chloride. Generally, the choline/excipient mixture is added to the top of the drying chamber by high pressure pump while the lubricant may be auger loaded into the drying chamber in drypowder form.

The lubricant may be added during processing in concentrations which range from about 0 to 10 wt-% of the finished product, preferably about 1 to 5 wt-% of the finished product, and most preferably about 2 to 4 wt-% (about 3 wt-% with calcium stearate) of the finished product. The lubricant may be added at varying rates to be main dryer. At this time, it has been found that adding the lubricant at a rate of 3 lbs/min. allows for the most efficient production of the choline composition of the invention. Given the processing conditions of the invention, (including temperature, time, and lubricant used), a major portion, and potentially all, of the lubricant may be lost during processing. As a result, the presence of the lubricant in the finished composition may be undetectable.

The lubricant, preferably calcium stearate, is added into the spray drying apparatus through a secondary line into the main dryer chamber, FIG. 1. The choline chloride liquid is also added through a primary line into the main dryer chamber of the spray dryer, FIG. 1.

Generally, the ratio of lubricant to choline chloride liquid is adjusted to provide the desired concentration of lubricant during processing. The ratio of calcium stearate to choline chloride may range from about 0.01 to 1 to about 0.06 to 1, and preferably from about 0.02 to 1 to about 0.05 to 1. When calcium stearate is used, the ratio of this constituent introduced into the spray dryer is sufficient to provide a constituent concentration of choline chloride of from about 80 wt-% to 99 wt-% in the final product. The composition is then spray dried and preferably intermixed with an additional volume of hydrophobic adjuvant.

Spray drying can be done in accordance with any of those methods known to those of skill in the art. Generally, the material is processed from inlet to exhaust at a temperature ranging from about 200° C. to 300° C. and at a pump pressure which may start at about 1000 psi and build to preferably about 6000 psi, and preferably from a starting pressure of about 2000 psi to build to a pressure of about 4800 psi.

Returning to FIG. 1, the choline chloride solution may be added at the inlet to the main dryer chamber by the high pressure pump. Generally, the high pressure pump is started and run at about 1000 psi to 2000 psi. When using a DeLaval spray dryer, this pressure may be manually adjusted upwards to a pressure of about 4800 psi. This adjustment increasing the pressure may take place over 5 to 30 minutes with 15 minutes being routine by adjusting the pressure a 1000 psi upwards every 5 minutes. At the same time, the lubricant may be auger delivered into the main dryer chamber, not the inlet.

As with any spray drying operation, once the product enters the main drying chamber it begins to dry and fall within the vortex created by the chamber. The larger particles drop to a transfer passage or tube. The finer materials are generally drawn off to the primary cyclone or collector as can be seen in FIG. 1. This ultimately allows for very little loss of materials. Otherwise, the finer particles may not drop out of the main dryer. From the primary collector or cyclone, fine particles may additionally be drawn off into the secondary collector or cyclone. At this point, all particles should drop out into the transfer passage, FIG. 1, with fugitive vapors being drawn off through the exhaust fan.

Various spray dryers may differ configuration. However, when using a DeLaval model 84-24, there are generally three fans being an inlet fan, an exhaust fan, and a power conveying fan, see FIG. 1. All three fans should be balanced to provide a zero (0) pressure gradient in the main drying chamber. The fan volume is about 13,000 cubic feet/minute for each fan. The cfm volume is equal across the three fans since the fans must balance each other out.

Generally, the inlet fan functions to dry product within the main dryer chamber through their creation of a vortex which ultimately passes product to the transfer passage or, alternatively, through the primary and secondary collectors. The exhaust fan functions to withdraw a fugitive vapors and exhaust from the spray drying system as well as assisting and conveying product from the main dryer chamber through the first and second collectors. The air pressure created by the exhaust fan has to be balanced against the power conveying fan to create the zero (0) pressure gradient which allows the optimal amount of product to drop into the transfer passage. In turn, the power conveying fan is an inlet negative air pressure source and may be used to pull smaller product particles from a smaller primary and secondary bagging cyclone collector or collectors allowing as much product to be collected as possible.

Ultimately, the product is transferred through the primary and secondary bagging cyclones into the bagging bin which collects and provides the various totes of product. Given the various temperatures and pressures of the spray drying process, it will be understood that the lubricant may become fugitive and vent out through the exhaust fan.

In use of the DeLaval's model 84-24 spray dryer, any number of spray drying nozzles may be used to process materials into the main dryer chamber. As known to those of skill in the art, the desired particle size, compositional density, and pressure all may be considered when determining which nozzle is to be used. However, Applicants have found that in the processing of the composition of the invention, a 42-632 nozzle is preferred rated at 0.0935 inches as available through Spraying Systems Company. Further, when setting the main burner temperature and preparation for processing the composition of the invention, the burner temp will generally range from about 170° F. to 230° F. with the preferred range being from about 180° F. to 200° F. This temperature is generally measured at the top of the primary collector and the main burner is to provide a temperature within this range.

Further, when using a lubricant to ease processing in accordance with the invention, the lubricant may generally be metered in through the use of means such as an auger. Applicants have found that the use of anywhere from about 1 lb. per minute to 6 lbs. per minute and preferably about 3 lbs. per minute assist in providing the appropriate choline chloride concentration in the final product. The increase use of a lubricant such as calcium stearate generally decreases choline chloride concentration and results in an increase cost. In contrast, the decrease use of a lubricant results in decreasing efficiency in the process of the invention.

Following drying in the spray dryer the product may be kept in a moisture controlled environment to prevent moisture pick up by the dried choline chloride, silica, calcium stearate mixture. The dry mixture is transferred to a ribbon blender where a hydrophobic amorphous precipitated silica in an amount $\geq 1\%$ of the total finished product is added. This mixture is then allowed to mix for 10 minutes. Following the mixing the product is packed in plastic bags.

Generally, the concentration of choline chloride within the final composition ranges from about 80 to 99 wt-%, preferably from about 85 to 99 wt-%, and most preferably greater than about 85 wt-%.

WORKING EXAMPLES

The following Examples are compositions formulated according to the method of the invention and are intended to be illustrative but not limiting of the claimed invention.

EXAMPLE 1

An initial spray-drying process was run to produce an 85 wt-% choline chloride product. The mix comprises 2500 pounds of choline chloride (75% w/v) and 465 pounds of 40 mesh corn cob. Once mixed, the composition was spray-dried and assayed.
Spray-Drying
Nozzle size: 0.0935 inches (42–640 Spraying Systems Co.)
Burner control temp: 230° F. taken at top of Primary Collector
Inlet temp: 440° F. taken at the Main Burner
High pressure pump: 2500–3500 psi
Product Character
Moisture: 0.5 wt-% average
Density: 32 (lb/ft$^3$) average
Assay: 82 wt-% average choline chloride
Finish product description: very light in color, very little odor
During processing, the spray drying nozzle plugged and was changed to a model 40-645. The lines were later cleaned and a screen was installed to separate larger particles. The nozzle was later switched back to a model 42-640. Drying was completed roughly 5 hours after initiation resulting in a product having 82 wt-% choline chloride.

EXAMPLE 2

This spray-drying experiment was undertaken in an attempt to provide a 90 wt-% choline chloride product using the process of Example 1. In Example 2, 7500 lbs choline chloride (75% (w/v)) were mixed with 562.5 lbs cob (40 mesh).
Spray-Drying
Nozzle size: 0.0935 inches (Size 42–632, Sprayer Systems Co.)
Burner control temp: 240° F.
Inlet temp: 540° F.
High pressure pump: 4000 psi Product Character
Moisture: 0.4 wt-% average
Density: 30 (lbs/ft$^3$) average
Assay: 85 wt-% average (choline chloride)
Finish product description: very powdery, light color, little odor
Comments on Operations:
0 minutes—Startup 2600 psi
8 minutes—Running 3500 psi
28 minutes—Maximum 4200 psi
60 minutes—Changed tote bag (full)
68 minutes—Lowered heat 5° to 235°
73 minutes—Lowered heat 5° to 230°
78 minutes—Nozzle plugged, stop production
91 minutes—Starting back up
113 minutes—Dryer cyclone plugged
124 minutes—Starting back up
138 minutes—Changing tote bag (full)
178 minutes—High pressure pump dropped to 2400 psi
183 minutes—Raised heat back to 240°
198 minutes—Changed bag #3
233 minutes—High pressure pump cleaning itself out-running back to 4000 psi
248 minutes—Finished drying

EXAMPLE 3

In this Example, the process of Example 1 was used to produce an 85% (w/w) choline chloride product by combining 4000 lbs choline chloride with 150 lbs cob (40 mesh) and 150 lbs silica, Sipernat® 50.
Spray-Drying
Nozzle size: 0.0935 inch (Size 42–632, Sprayer Systems Co.)
Burner control temp: 230° F.
Inlet temp: 495° F.
High pressure pump: started at 2000 psi for 45 minutes with the ultimate pressure being 5400 psi
Product Character
Moisture: 0.3 wt-% average
Density: 25.83 (lbs/ft$^3$) average
Assay: 85.17 wt-% average (choline chloride)
Finish product description: beige with little particles of cob
Comments on Operations
8 minutes—adjusting both fans to see if we can control the product to fall mainly in dryer cyclone.
45 minutes—Starting back up. Raised heat to 240° C. and lowered product to 2000 psi.
90 minutes—Raised high pressure pump to 3000 psi.
120 minutes—Shut mix off. System plugged again. Change full tote.
140 minutes—Starting back up. Open the fans to consider any changes.
255 minutes—Mix is still plugging up the cycle valves and conveying lines.
—Finished drying.

EXAMPLE 4

In this Example, the process of Example 1 was again used to produce a composition of 85% choline chloride using 2500 lbs choline chloride (75% w/v), and 330 lbs silica, Sipernat® 50.
Spray-Drying
Nozzle size: 0.0935 inch (size 42–632, Sprayer Systems Co.)
Burner control temp: 225° F. to 240° F.
Inlet temp: 400° F.

High pressure pump: 2000 psi–5000 psi  
Product Character  
Moisture: 0.8 wt-% average  
Density: 27 (lb/ft$^3$) average  
Assay: 85.2 wt-% average (choline chloride)  
Finish product description: white powdered, fine texture, mild odor

| Comments on Operations | |
|---|---|
| 25 minutes | Dryer cyclone plugged |
| 35 minutes | Changed nozzle to a 42-425 to see if it helps |
| | Cyclone dryer temp - 147° C. |
| | Primary temp - 109° C. |
| | Secondary temp - 106° C. |
| | Burner - 240° C. |
| | Inlet - 420° F. |
| | High pressure pump - 4000 psi |
| 55 minutes | Product became a jelly like. The system plugged up again. |
| 65 minutes | Start back up. Trying a larger nozzle 46-640. |
| | Lower pressure. (1800 psi) higher heat 250° C. |
| | Dryer temp - 167° C. |
| | Primary - 123° C. |
| | Secondary - 119° C. |
| 125 minutes | System plugged up again. Trying a smaller nozzle 42-625. |
| | High pressure pump - 2200 psi |
| | Burner - 225° C. |
| | Dryer - 140° C. |
| | Primary - 107° C. |
| | Secondary - 105° C. |
| 155 minutes | Product still plugging the cycle valves and conveying lines. |
| 195 minutes | Turned calcium stearate on. Hopper is situated at the top of the dryer cyclone. |
| | Within minutes the cycle valves and conveying lines cleaned out. |
| 205 minutes | Raised high pressure pump to 5000 psi |
| | Inlet - 460° F. |
| | Burner - 250° C. |
| | Dryer - 158° C. |
| | Primary - 118° C. |
| | Secondary - 116° C. |
| | Finished drying |

EXAMPLE 5

This formulation was undertaken to prepare a high concentration choline chloride product. In this instance, 7500 lbs. of choline chloride (87.6 wt-%) were intermixed with 990 lbs. of Sipernat® 22 (11.5 wt-%) and 77 lbs. of calcium stearate (0.9 wt-%). During spray drying which took approximately 4 hrs., the burner temperature range from 230° F. to 240° F. With the pressure on the high-pressure pump ranging from 3000 psi to 5000 psi. The assay resulted in a choline chloride product which was measured at 84.61 wt-% choline chloride, 0.45% moisture. The product had a density of 34.26 lbs. per cubic ft. During processing, the dryer cyclone plugged. The plugging was thought to result from the low burner temperature and the high volume of product pushed into the dryer.

The dryer cyclone temperature range from 159° F. to 152° F. during processing with the primary cyclone temperature ranging from 115° F. to 117° F. during processing and the secondary cyclone temperature ranging from approximately 112° F. to 115° F. during processing. The cold cyclone temperature range from 26° F. to 30° F. When five separate samples of the sprayed dried product were allowed to deliquire at ambient temperatures, the samples were found to gain between 4 and 5 wt-% additional weight after 7 days.

EXAMPLE 6

An additional experiment was undertaken to determine the relative moisture gain of various products formulated in accordance with the invention versus those products commercially available. Example 6a was formulated from 88.28 wt-% choline chloride solution (75% active), with 10.94 wt-% Sipernat® 22 silica, and 0.78 wt-% calcium stearate.

Sample 6a was reported to have a choline chloride concentration of 85 wt-% when completely formulated.

Sample 6b was also comprised formulated from 88.28 wt-% choline chloride solution (75% active) with 10.15% Sipernat® 22 silica and 1.57 wt-% calcium stearate to result in a choline chloride spray dried composition which was 85 wt-% active.

Sample 6c was formulated from 88.28 wt-% choline chloride solution (75 wt-% active), with 5.86% Sipernat® 22 and 5.86% calcium stearate to result in a choline chloride composition which was 85 wt-% active.

Sample 6d was a comparative example of commercially available Chinook choline chloride (60% active). Sample 6e was a commercially available sample of Chinook choline chloride (50% active). The moisture absorbents of these compositions was then measured over a 10 day period in two separate locations, locations A and B as seen below. The results are reported below and percent of moisture gained.

| Moisture Gain as a Percentage of Original Tare Weight | | |
|---|---|---|
| Example | A | B |
| 6a | 37.60% | 22.96% |
| 6b | 34.88% | 21.70% |
| 6c | 32.34% | 19.32% |
| 6d | 26.04% | 13.32% |
| 6e | 28.18% | 15.16% |

EXAMPLE 7

Three separate formulations were undertaken to determine the impact of the addition of a lubricant at various rates over a processing time. In each instance, a composition was formulated using choline chloride, Sipernat® 22, and calcium stearate lubricant. In each instance, the calcium stearate was metered into the composition at a different rate.

Example 7a

Example 7a was formulated from 7500 lbs. choline chloride (75% active), 929.5 lbs. Sipernat® 22, and 66.5 lbs. calcium stearate. In the first example, the spray drying process took 5 hrs. and 25 min. with a burner temperature ranging from 250° F. to 240° F. The calcium stearate was metered in by the auger feeder which turned at a rotation of 75 rpm. The dryer cyclone temperature ranged from 156° F. down to 140° F. with the primary cyclone temperature ranging from 119° F. down to 113° F. The secondary cyclone temperature range from 118° F to 111° F. The high pressure pump was started at 2000 psi and metered up to 5000 psi, but then eventually adjusted downward to 4000 psi. The ultimate product assayed at 84.09 wt-% choline chloride was 0.5% moisture.

Throughout the test there were problems with product conveying. The product was believed to be very hot coming out of the dryer and remained hot up until bagging. It was determined that more calcium stearate was needed to be added to help convey the product. 7,500 pounds of choline chloride (75% active) was combined with 929.5 pounds of Sipernat® 22 silica and 66.5 pounds of calcium stearate. A 42-632 nozzle was used.

Example 7b

Example 7b was formulated using 7500 lbs. choline chloride solution (75% active), 862.5 lbs. Sipernat® 22, and 133.5 lbs. calcium stearate. This run took approximately 3 hours and 40 minutes with a burner temperature ranging from 250° F. down to 215° F. The dryer cyclone temperature was initiated at 144° F. and then adjusted down to an ultimate temperature of 124° F. with the primary cyclone temperature varying between 116° F. and 101° F. The high pressure pump was initiated at 2000 psi and adjusted to 5200 psi, with the ultimate pressure being 4800 psi. The ultimate product assayed at 85.26% choline chloride with 0.7% moisture and a density of 36.3 lbs. per sq. ft. Here again, a 133.5 lbs. of calcium stearate was metered into the composition over a time by an auger feeder which was set at 105 rpm. During processing, the main nozzle had plugging problems. However, the increase concentration of calcium stearate resulted in better conveyance of the product. 7,500 pounds of choline chloride (75% active) was combined with 862.5 pounds of Sipernat® 22 and 133.5 pounds of calcium stearate. The nozzle used during spray drying was a 42-632 SB from Sprayer Systems Co.

Example 7c

The run combined 7500 lbs. of choline chloride solution (75% active), with Sipernat® 22, 498 lbs. and 498 lbs. of calcium stearate. The calcium stearate was metered into the system at 275 rpm over the run. In this instance, the run took approximately 2.5 hours. The burner temperature was varied from 230° F. down to 180° F. with a dryer cyclone temperature ranging from 134° F. to 101° F. at completion. The primary cyclone temperature was 107° F. ranging down to 84° F. at completion and the secondary cyclone temperature was 107° F. ranging down to 85° F. at completion. The high pressure pump was initiated at 2,500 psi and adjusted upwards to an ultimate pressure of 4,200 psi at completion. The finished product assayed at 85.54% active choline chloride with 1.5% moisture and a density of 35.3 pounds per square foot.

In this run, there was no plugging with the pressure being maintained at 4,200 psi. The conveying of the product was found to be fast flowing and very consistent. It was determined that the burner temperature does not need to be as high as undertaken in earlier examples. A 42-632 nozzle was used from Sprayer Systems Co. as was also used on runs 7a and 7b.

EXAMPLE 8

In order to test the free-flow ability of the composition of the invention versus those products which were commercially available, a choline chloride composition was formulated in accordance with the invention. Example 8a was formulated in accordance with the invention and comprised 1% Sipernat® D17, 88% choline chloride solution (75% active), 8% Sipernat® 22 and upon mixing 5.82% calcium stearate. The final composition comprised 3% calcium stearate after formulation. A comparative Example 8b comprised Chinook Brand choline chloride (60%). Approximately 200 grams of each sample was placed into two receptacles and inserted into an oven which had been adjusted to 47° C. A pan of water was placed on the base of the oven to allow for increased humidity. A hygrometer was placed in the oven to read relative humidity. The samples were left in the oven for approximately 7.5 hours at which time the relative humidity ranged from 49–47%. The temperature in the oven was constant at 31° C. After this period of time, the samples were tested to determine the angle of repose. In testing the angle of repose, (FIG. 2), approximately 200 grams of material to be tested is allowed to flow through a funnel with a spout diameter of approximately 0.75 inches. The tip of the spout is supported approximately 10 inches above a flat surface. All the test material is allowed to flow through the funnel and deposit on a flat surface. The angle of repose was measured as angle A by marking or tracing the shape of the resulting pile, marking the highest point of the pile and the widest point of the pile described by as angle A approaches 0°, the flowability of the product being tested is said to increase.

Example 8a, the invention, at an angle of repose of 28.5°. While comparative Example 8b had an angle of repose at 47°. The samples were replaced into the oven and left for an additional 16.5 hours at which time they were removed and retested. At this time, Example 8a (the invention) had an angle repose of 27.5° and comparative Example 8b had an angle of repose of 49.5°.

EXAMPLE 9

An additional run was undertaken to produce a high concentration choline chloride. The constituents of the composition comprise 88.28% choline chloride (75 wt-% active), 5.86% Sipernat® 50 and 5.86% calcium stearate. The run took approximately 5 hours and 40 minutes due to the plugging of the main dryer.

The example was undertaken to formulate a dry choline chloride product with Sipernate® 50 which has a higher particle size. Over the time period of the run, the burner temperature ranged from 230° F. to 240° F. The inlet temperature ranged from 480° F. to 530° F. Pump pressure was initiated at 5,000 psi and ranged from 5,000 psi down to 4,200 psi over the process of the run.

Upon assay, the final product showed an average choline chloride concentration of 88.17 wt-% active choline chloride with 0.8 wt-% moisture. The nozzle used was a SB 42-632 made by Sprayer Systems Co. This run differed in that a rotary valve was installed on the bottom of the dryer cyclone. The rotary valve was installed to attempt to control the exhaust and the plugging of the dryer cyclone.

A cooling system was also installed to help moderate the final bagging temperature. Within the first 20 minutes of processing, the rotary valve became plugged and was removed. Ultimately, the composition was run as had been done in earlier working examples where Sipernat® 22 was used. This run was undertaken for two hours without any problems. At three hours and 40 minutes into the run, the cooling system was connected back up to the spray dryer. The cool air coming into the system had a temperature of about 52° F. while the bag temperature remained at 140° F. The cooling system was adaptable to the conveying system. We found that while choline chloride and Sipernat® 50 was a little bit more difficult to process (Sipernat® 50 has a particle size of 50 microns), it does provide a high concentration of choline chloride in the final composition.

The above discussion, examples, and data illustrated are current understanding of the invention. However, since many variations of the invention can be made without departing from the spirit and scope of the invention, the invention resides wholly in the claims hereinafter appended.

We claim as our invention:

1. A spray dried powdered choline feed stock precursor comprising:
   a. greater than about 85 wt-% of a choline compound;
   b. from about 0.25 to 5 wt-% of a hygroscopic excipient effective to provide a free flowing composition; and
   c. from about 1 to 3 wt-% of a hydrophobic adjuvant.

2. The composition of claim 1 comprising a lubricating agent, wherein said lubricating agent is selected from a group consisting of an organic compound, an inorganic compound, and mixtures thereof.

3. The composition of claim 2 wherein said organic lubricating agent comprises a fatty acid salt.

4. The composition of claim 3 wherein said lubricating agent comprises calcium stearate.

5. The composition of claim 1 wherein said excipient is selected from the group consisting of a silicon oxide, a zinc oxide, an aluminum oxide, a carbon oxide, a lithium oxide, and mixtures thereof.

6. The composition of claim 4 wherein said excipient comprises silica.

7. The composition of claim 1 wherein said choline is provided by choline chloride.

8. A spray dried free flowing particulate choline feed stock precursor comprising:
   a. greater than 85 wt-% choline;
   b. from about 1 wt-% to 10 wt-% of a lubricating agent;
   c. from about 0.25 wt-% to 5 wt-% of an excipient, said excipient comprising hydrophilic silica; and
   d. from about 1 to 3 wt-% of a hydrophobic adjuvant.

9. The composition of claim 8 wherein said lubricating agent comprises a fatty acid salt, wherein said fatty acid salt is selected from a group consisting of calcium stearate, magnesium stearate, potassium stearate, and mixtures thereof.

10. The composition of claim 8 wherein said lubricating agent comprises calcium stearate.

11. The composition of claim 8 wherein said hydrophobic adjuvant comprises a hydrophobic silica present in a concentration ranging from about 1 to 3 wt-%.

12. The composition of claim 8 wherein said choline is provided by choline chloride.

13. A feed stock comprising the choline feed stock precursor of claims 1 or 8.

14. A process for formulating a choline feed stock precursor, said choline feed stock precursor comprising greater than about 85 wt-% of a choline compound, and an excipient, said process comprising the steps of:
   a. inter mixing a liquid source of said choline compound with a lubricating agent, a hygroscopic excipient and a hydrophobic adjuvant to provide a choline chloride feed stock precursor having a choline chloride concentration of greater than about 85 wt-% from about 1 wt-% to 10 wt-% of a lubricating agent, from about 0.25 wt-% to 5 wt-% of an hygroscopic excipient and from about 1 to 3 wt-% of a hydrophobic adjuvant; and,
   b. spray drying said mixture in the presence of a lubricating agent at a temperature of at least about 200° C.

15. The process of claim 14 wherein a hydrophobic stabilizing adjuvant is added to the mixture after spray-drying.

16. The process of claim 14 wherein said choline compound concentration is about 85wt-% or greater.

17. The process of claim 14 wherein said lubricating agent is selected from a group consisting of an inorganic compound, an organic compound, and mixtures thereof.

18. The process of claim 14 wherein said lubricating agent comprises calcium stearate.

19. The process of claim 14 wherein said excipient is selected from the group consisting of an inorganic compound, an organic compound, and mixtures thereof.

20. The process of claim 19 wherein said excipient comprises hydrophilic silica.

21. The process of claim 14 wherein said choline is provided by choline chloride.

22. The composition of claim 1, wherein said choline feed stock precursor comprises a free flowing powder.

* * * * *